April 14, 1942.   C. WHITE ET AL   2,279,649
VALVE SEAT DRIVER
Filed March 24, 1939
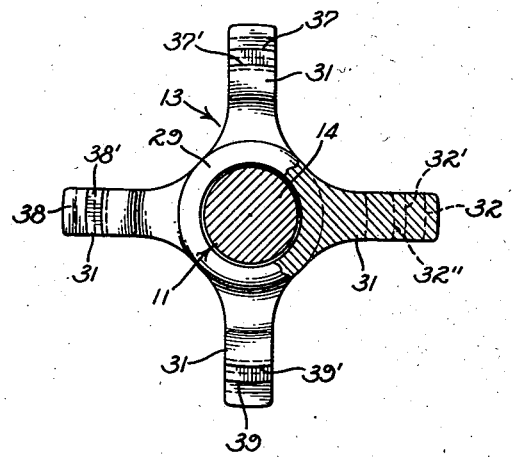
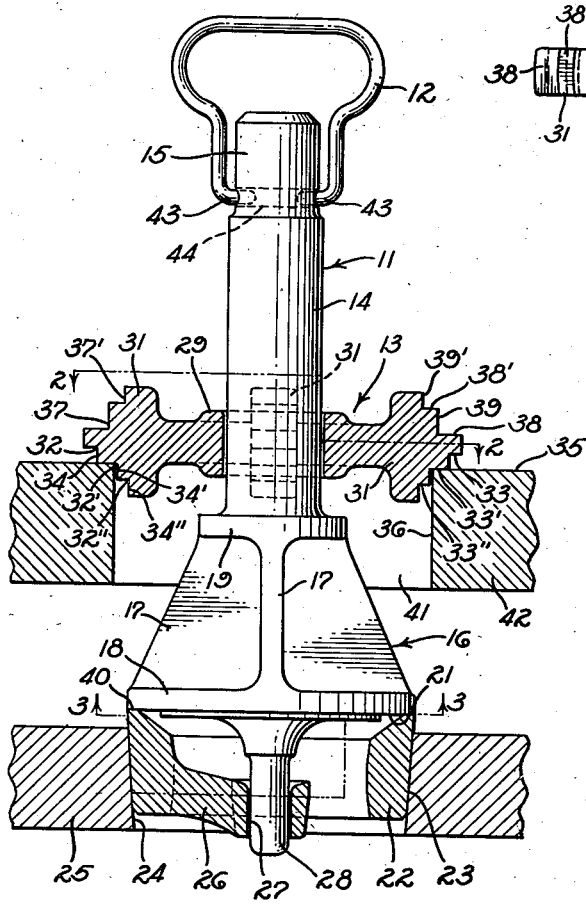
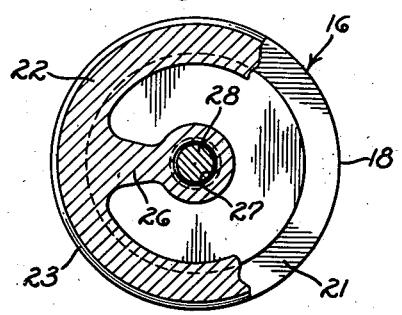
INVENTORS
CLARENCE WHITE
OLIVER B. GRAHAM
BY HARRIS, KIECH, FOSTER & HARRIS
FOR THE FIRM
ATTORNEYS.

Patented Apr. 14, 1942

2,279,649

UNITED STATES PATENT OFFICE 2,279,649

VALVE SEAT DRIVER

Clarence White, Walnut Park, and Oliver B. Graham, Los Angeles, Calif., assignors to Oil Well Manufacturing Corporation, Los Angeles, Calif., a corporation of California Application March 24, 1939, Serial No. 264,028

10 Claims. (Cl. 29—88.2)

This invention relates to valve seat drivers for installing valve seats in pumps or other machinery characterized by fluid chamber walls having egress and ingress ports which are controlled by disk valves. The port apertures of such machinery are usually slightly tapered to receive the correspondingly tapered valve seats. The valve seats are replaceable when they become worn. When one of these valve seats is installed, it is driven into place by the application of a relatively heavy, evenly distributed pressure. Valve seat drivers, to which this invention relates, are used for this purpose.

The cylinder of the pump or other machinery is formed with an inner wall, usually known as the cylinder deck, in which is formed the valve aperture, and an outer wall, the two walls enclosing the valve chamber. This outer wall is formed with an aperture or orifice concentric with the valve aperture in the cylinder deck. This latter aperture or orifice serves as a means of convenient access to the valve and is sometimes used additionally as a seat for valve guide devices with which the valve cooperates in its movement and by which it is caused to move in a path normal to the plane of the valve seat.

The valves are sometimes provided with an axial stem projecting into the valve aperture. This stem slidably fits within and cooperates with a stem guide formed as a part of the valve seat and centrally thereof.

The purpose of this invention is to provide a valve seat driver which will be properly centered with respect to the valve seat so as to drive all circumferential portions of the seat evenly into the valve aperture.

It is a further purpose of the invention to provide a valve seat driver formed to cooperate with the valve stem guide or other portions of a valve seat as a means for centering the driver. It is also a purpose of this invention to provide a valve seat driver which will be formed to cooperate with the aperture or orifice in the outer wall of the valve chamber in a manner to center the valve seat driver with respect to the valve seat.

It is a further purpose of the invention to provide a valve seat driver which will be thus formed to cooperate with the aperture in the outer wall of the valve chamber and be adaptable for use with several pumps or other pieces of machinery of different makes or having different sized apertures in the outer valve chamber wall, and having valve chambers of different depths.

It is also an object of this invention to provide a valve seat driver which will be inexpensive to manufacture, conveniently manipulated, efficient in operation, and durable.

Other objects of the invention will be apparent from a reading of the description and an inspection of the drawing herein.

Referring to the drawing,

Fig. 1 is a side elevation of the valve seat driver, with the driver guide, and adjacent portions of a valve chamber with which the driver is adapted to be used, shown in section.

Fig. 2 is a horizontal sectional view taken along the line 2—2 of Fig. 1.

Fig. 3 is a horizontal sectional view taken along the line 3—3 of Fig. 1.

The driver has three parts: a shank 11, a bail 12, and a guide 13.

The shank 11 is one integrally formed piece of metal and has a central cylindrical portion 14, a cylindrical percussion head 15 of slightly reduced diameter adapted to receive the blows of a hammer, and a driving head 16 at the other end of the shank. This driving head 16 comprises an upper disk 19 and a lower disk 18 integrally connected by vertically disposed, radial webs 17. The lower face of the lower disk 18 is machined to present an annular face 21 adapted to engage the upper horizontal face 40 of a valve seat 22. The slightly tapered peripheral wall 23 of the valve seat 22 engages the correspondingly tapered wall 24 of a cylinder deck 25.

The valve seat shown in the drawing to illustrate the use of the valve seat driver is one of the type having a centrally extending projection 26 formed with an aperture 27 which is concentric with the peripheral wall 23 of the valve seat. The aperture 27 is designed to receive the stem of the valve (not shown) which cooperates with the valve seat. The valve seat driver is formed with an integral stem 28 projecting centrally downwardly from the lower disk 18. The stem 28 is of a diameter to snugly fit within the aperture 27 and serves to center the driving head 16 with respect to the valve seat. If the valve seat is not formed with the apertured projection 26 or the like, instead of the stem 28, any similar longitudinally projecting element may be formed on the lower end of the valve seat driver to vertically slidably engage some cooperating surface on the valve seat.

The driver guide 13 is one integral piece of metal formed with radial arms 31 and a hub 29 which snugly fits upon and is vertically slidable with respect to the central portion 14 of the shank. The lower sides of the arms 31 are formed with a plurality of shoulders 32, 32', and 32″, having, respectively, horizontal faces 33, 33′, and 33″, and vertical faces 34, 34′ and 34″. As shown in the drawing, the vertical faces 34′ are arranged on a circle of a diameter to snugly fit within the vertical face 36 of the aperture 41 of the upper cylinder wall 42. The horizontal faces 33′ rest upon the horizontal face 35 of the cylinder wall and vertically support the guide 13. This engagement of the guide 13 with the horizontal and vertical faces 35 and 36, respectively, of the upper cylinder wall centers the shank 11 with respect to the valve seat 22, while at the same time permitting the shank to be moved downwardly with respect to the guide 13 as the shank drives the valve seat into position.

The upper sides of the arms 31 are formed with shoulders 37 and 37′ having, respectively, horizontal faces 38 and 38′ and vertical faces 39 and 39′. The apertures in the upper cylinder walls of machinery of this type are of different diameters, depending upon the particular make and model of the machine. A valve seat driver constructed in accordance with this invention may be used with machines having apertures of different diameters.

As shown in the drawing, the driver which typifies this invention is usable with machines having apertures of five different diameters. Three cooperating shoulders are formed upon the lower sides of the arms 31, and two cooperating shoulders are formed on the upper sides of the arms 31. When the diameter of the aperture 41 is such as to require the use of the shoulders 37 or 37′, the bail 12 is removed from the percussion head 15, the guide 13 is removed from the central portion 14 of the shank, the percussion head 15 is inverted and replaced, and the bail is again attached to the percussion head. The bail 12, which is provided for convenience of handling the valve seat driver, may be sprung so as to remove the ends 43 of the bail from the diametral bore 44 by which it is secured flexibly to the percussion head 15.

It will be observed that the face 21 of the lower disk 18 of the driver is of sufficient width to operatively engage valve seats which vary in diameter within a given range. It will also be observed that because of the longitudinally movable relationship of the guide 13 to the central portion 14 of the shank 11, the valve seat driver is adapted to be used in installing valve seats in pumps and other machinery of like character, in which the distance between the cylinder deck 25 and the horizontal face 35 of the upper cylinder wall 42 varies within a limited dimensional range.

It will thus be evident that by this invention a valve seat driver is provided which is adaptable for use with a plurality of pumps having, within a limited range, different sized valve seats, different sized apertures in the upper cylinder wall, and different distances between the valve deck and the outer face of the upper cylinder wall. This feature of adjustability reduces the number of sizes of valve seat drivers of this type which are required to meet the needs of the trade. It enables a user of valve seat drivers to carry in his stock of tools a minimum number of such tools, possibly only one, in spite of variations in the measurements above specified in the several different pieces of machinery which he may be operating.

We claim as our invention:

1. In combination with a valve seat formed with a centrally projecting arm apertured to provide a valve stem guide, a valve seat driver comprising: a driving shank formed with a percussion head at one end and an annular face at the other end adapted for axial thrust engagement with said valve seat, and an integral central guide pin projecting from said last named end adapted to snugly longitudinally slidably fit within said apertured stem guide.

2. In combination with a valve seat formed with a centrally projecting arm apertured to provide a valve stem guide, said valve seat being adapted to be seated within an aperture in a valve deck, said deck being associated with an outer cylinder wall having an orifice concentric with said aperture to provide access to the valve or for mounting a valve guide, a valve seat driver comprising: a driving shank formed with a percussion head at one end, and an annular face at the other end adapted for axial thrust engagement with said valve seat; an integral central guide pin projecting from said driving shank at said other end and beyond said face and adapted to snugly longitudinally slidably fit within said apertured stem guide; and further comprising an annular driver-centering guide snugly and longitudinally slidably engaging said shank and formed adjacent its peripheral bounding line with annularly arranged shoulder means adapted to engage the outer face of said outer cylinder wall and the wall of said orifice.

3. A valve seat driver for installing a valve seat in a valve aperture in a cylinder deck, said deck being associated with an outer cylinder wall having an orifice concentric with said aperture to provide access to the valve or for mounting a valve guide, comprising: a driving shank formed with a valve seat engaging face at one end thereof and a percussion head at the outer end thereof; means rigidly secured to the said one end of said shank adapted to slidably and concentrically engage said valve seat to center said shank with respect to said aperture; and means slidably and concentrically engaging said shank adapted to engage the wall of said orifice and center said shank with respect thereto.

4. The combination in a valve seat driver of: a driving shank for pressing a valve seat in an aperture in a cylinder wall and provided with an annular valve seat engaging face disposed in a plane perpendicular to the axis of said driving shank, said face being adapted for axial thrust engagement with said valve seat; a first means disposed in a plane normal to the axis of said driving shank on one side of the plane of said face and adapted to center said driving shank with respect to said aperture; and a second means disposed in a plane normal to the axis of said driving shank on the other side of the plane of said face and adapted to center said driving shank with respect to said aperture.

5. A valve seat driver for installing a valve seat in a valve aperture in a cylinder deck, said deck being associated with an outer cylinder wall having an orifice concentric with said aperture to provide access to the valve or for mounting a valve guide, comprising: a driving shank having a central portion and formed with a percussion head at one end and an annular valve seat engaging face at the other end adapted for axial thrust engagement with said valve seat, the diameter of said face being greater than the thickness of the central portion of said shank; an annular driver-centering guide snugly and longitudinally slidably engaging said shank and formed adjacent its peripheral bounding line with annularly arranged shoulder means adapted to engage the outer face of said outer cylinder wall and the wall of said orifice; and a bail at one end of said shank, said bail being of greater width than the thickness of the central portion of said shank.

6. In a valve seat driver for installing a valve seat in an aperture, the combination of: a driving shank; percussion head means on one end of said shank; driving head means on the other end of said shank and adapted to engage a valve seat; and guide means for guiding movement of said shank and said driving head relative to the valve seat.

7. In a valve seat driver for installing a valve seat in a valve seat aperture, the valve seat having a guide aperture therein, the combination of: a driving shank; percussion head means on one end of said shank; driving head means on the other end of said shank and adapted to engage a valve seat; guide means for guiding axial movement of said shank relative to said valve seat; and guiding means associated with said driving head means and adapted to cooperate with said guide aperture in the valve seat to guide axial movement of said head relative to said valve seat.

8. In a valve seat driver for installing a valve seat in a valve seat aperture, the combination of: a driving shank; percussion head means on one end of said shank; driving head means on the other end of said shank and adapted to engage a valve seat; guide means carried by said shank for guiding axial movement of said shank relative to the valve seat aperture; and means for detachably retaining said guide means on said shank.

9. In a valve seat driver for installing a valve seat in a valve seat aperture, the valve seat having a guide aperture therein, the combination of: a driving shank; percussion head means on one end of said shank; driving head means on the other end of said shank and adapted to engage the valve seat; guide means carried by said shank for guiding axial movement of said shank relative to said valve seat aperture; and guiding means associated with said driving head and adapted to cooperate with the guide aperture in the valve seat for maintaining said driving head in axial alignment with said valve seat.

10. In a valve seat driver for installing a valve seat in a valve seat aperture, the valve seat having a guide aperture therein, the combination of: a driving shank; percussion head means on one end of said shank; driving head means on the other end of said shank and adapted to engage the valve seat; a guide member carried on said shank so as to permit axial movement of said shank relative thereto; and a stem on said driving head means adapted to cooperate with the guide aperture of the valve seat for maintaining said driving head means in axial alignment with said valve seat.

CLARENCE WHITE.
OLIVER B. GRAHAM.